US007823491B2

(12) United States Patent
Chaffin et al.

(10) Patent No.: US 7,823,491 B2
(45) Date of Patent: Nov. 2, 2010

(54) SYSTEM AND METHOD FOR REDUCING PHYSIOLOGICAL MATERIAL ON SURFACES OF CUT MEAT

(75) Inventors: Phillip L. Chaffin, Sandy, UT (US); Calvin D. Jones, Murray, UT (US)

(73) Assignee: Kleen Kut, Inc., Sandy, UT (US)

( * ) Notice: Subject to any disclaimer, the term of this patent is extended or adjusted under 35 U.S.C. 154(b) by 0 days.

(21) Appl. No.: 12/365,714

(22) Filed: Feb. 4, 2009

(65) Prior Publication Data

US 2009/0255390 A1 Oct. 15, 2009

Related U.S. Application Data

(60) Provisional application No. 61/044,416, filed on Apr. 11, 2008.

(51) Int. Cl.
*B26D 7/08* (2006.01)

(52) U.S. Cl. ........................................... 83/168; 83/788

(58) Field of Classification Search ..................... 83/13, 83/168, 788, 167; 143/158, 166
See application file for complete search history.

(56) References Cited

U.S. PATENT DOCUMENTS 1,870,774 A * 8/1932 Gaines ........................ 83/168
1,908,727 A 5/1933 Bleam
1,916,596 A * 7/1933 Winfree, Jr. .................. 83/168
2,529,249 A * 11/1950 Flood .......................... 184/65
2,992,663 A * 7/1961 Hendrickson ............ 83/522.14
4,608,892 A * 9/1986 Noizet ......................... 83/168
6,467,278 B1 * 10/2002 Hu et al. ........................ 62/62
2002/0178883 A1 * 12/2002 Yamamoto ..................... 83/22
2005/0081690 A1 4/2005 Biro

* cited by examiner

*Primary Examiner*—Ghassem Alie
(74) *Attorney, Agent, or Firm*—Thorpe North & Western LLP

(57) ABSTRACT

A system and method for reducing physiological material on surfaces of meat cut transferred to surfaces of cut meat by an endless band saw blade is disclosed. The system includes a water jet manifold positioned adjacent the saw blade and having a first and second nozzle orifices formed therein, the first and second orifices operable to be placed in fluid communication with a source of water. The first nozzle orifice is operable to direct a first water jet substantially across and into a first side surface of the saw blade and a second nozzle orifice is operable to direct a second water jet substantially across and into a second side surface of the saw blade. Together, the first and second water jets direct a sufficient volume of water onto the saw blade to remove residual physiological material and to deposit a layer of water onto the first and second side surfaces of the saw blade, which layer of water acts as a lubricant to reduce the residual physiological material that adheres to the saw blade and thereby reduces the residual physiological material transferred to the surfaces of cut meat by the saw blade.

17 Claims, 6 Drawing Sheets

10
18
180
12
20
16
20
190
120
100
112
160
110
14
140
148

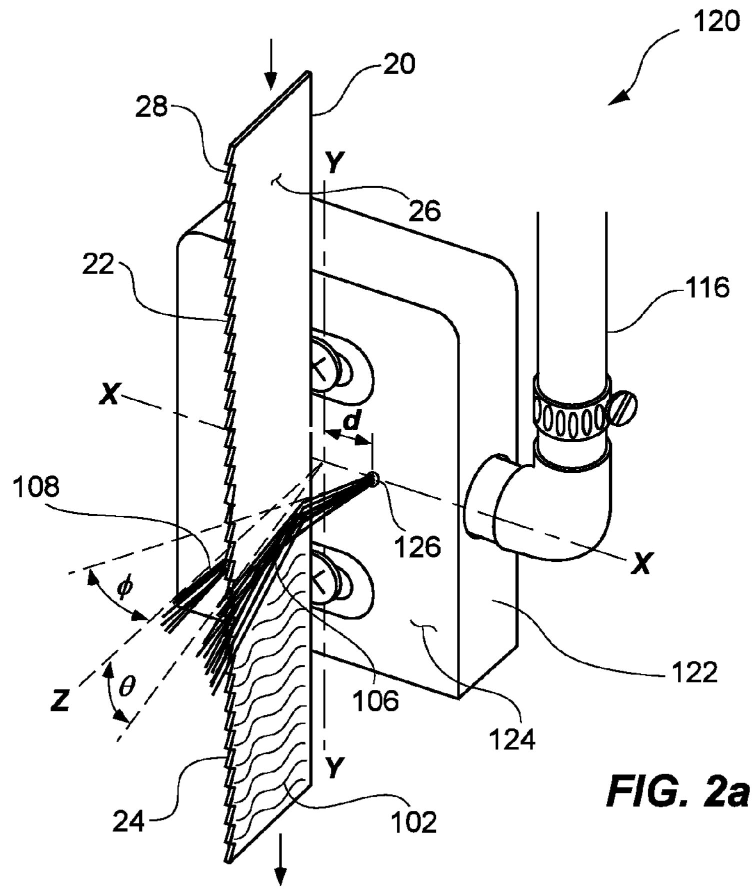
FIG. 2a
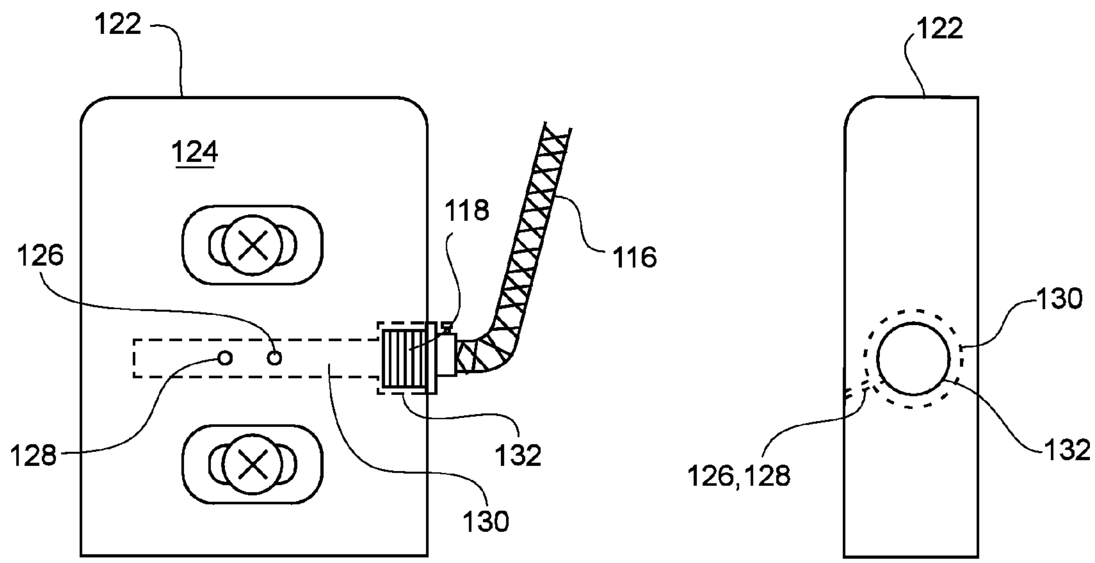
FIG. 2b
FIG. 2c

SYSTEM AND METHOD FOR REDUCING PHYSIOLOGICAL MATERIAL ON SURFACES OF CUT MEAT

RELATED APPLICATIONS

This application claims priority to U.S. Provisional Application Ser. No. 61/044,416, filed Apr. 11, 2008, and entitled "System And Method For Reducing Physiological Material On Surfaces Of Cut Meat", which application is incorporated by reference in its entirety herein.

BACKGROUND OF THE INVENTION AND RELATED ART

The meat cutting industry has generally undergone very little change over the last several decades. Meat is typically sent from slaughterhouses in fairly large pieces to meat markets, grocery stores, and other retailers where it is cut into roasts, steaks, and the various other types of cuts of meat for resale to the public. A band saw is most often used to cut the meat into its final resale size.

A specialized blade called a bone saw is used for cuts of meat that include portions of bone, such as ribs, rib-eye, and t-bone steaks. A knife blade is commonly used for cuts of meat that do not include bones such as fillet mignon steaks. As the blades pass through the meat at relatively high speeds, they pick up residual physiological material including blood, fat, bone dust, and bone marrow. The residual material sticks to the blade as it travels around the band saw. A portion of the residual material is then transferred to the surface of the meat.

The residual material can cause unsightly discoloration of the meat surface. The residual material can undergo denaturing caused by friction from the heat of the saw blade. The residual material, both raw and denatured, can be a haven for bacterial growth. Many meat cutters scrape at least one surface of the meat with a scraper after it has been cut in an attempt to remove as much residual physiological material as possible. However, a thin layer of the residual physiological material typically remains on the meat, thereby degrading the cut meat's appearance and reducing its overall shelf life.

Various methods have been used to reduce the amount of residual physiological material on the band saw blade. For example, specialized scrapers have been developed to scrape the saw blade as it travels around the band saw. However, scraping the saw blade can increase friction, thereby heating the blade and increasing the amount of denatured material that is retained on the blade and subsequently transferred to the surfaces of cut meat. Scraping can also increase wear and tear on both the saw blade and other components of the band saw.

Additionally, scraping can only remove a portion of the residual material. Some of the physiological material is sufficiently adhered to the blade that it resists removal through scraping. A fairly large percentage of the overall residual material can be adhered to surfaces in the teeth of the blade that are substantially orthogonal to the scraper, thereby limiting any removal of the material through scraping. Moreover, bone saw blades have teeth that are alternately directed at opposite angles to allow the blade to more easily pass through bones. These alternately directed teeth would quickly wear or shred a scraper applied to the blade. Therefore, scraping of bone saw blades is limited to the area behind the teeth, leaving a large amount of residual physiological material on the surfaces of the teeth that can then be transferred to the surface of the cut meat products.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments of the present invention and are not, therefore, to be considered limiting of its scope. And furthermore, it will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings, in which:

FIG. 2*a* illustrates a perspective schematic view of a water jet manifold, in accordance with the embodiment of FIG. 1;

FIG. 2*b* illustrates a front view of the manifold of FIG. 2*a;*

FIG. 2*c* illustrates a side view of the manifold of FIG. 2*a;*

DETAILED DESCRIPTION OF EXEMPLARY EMBODIMENTS

Figure 1:
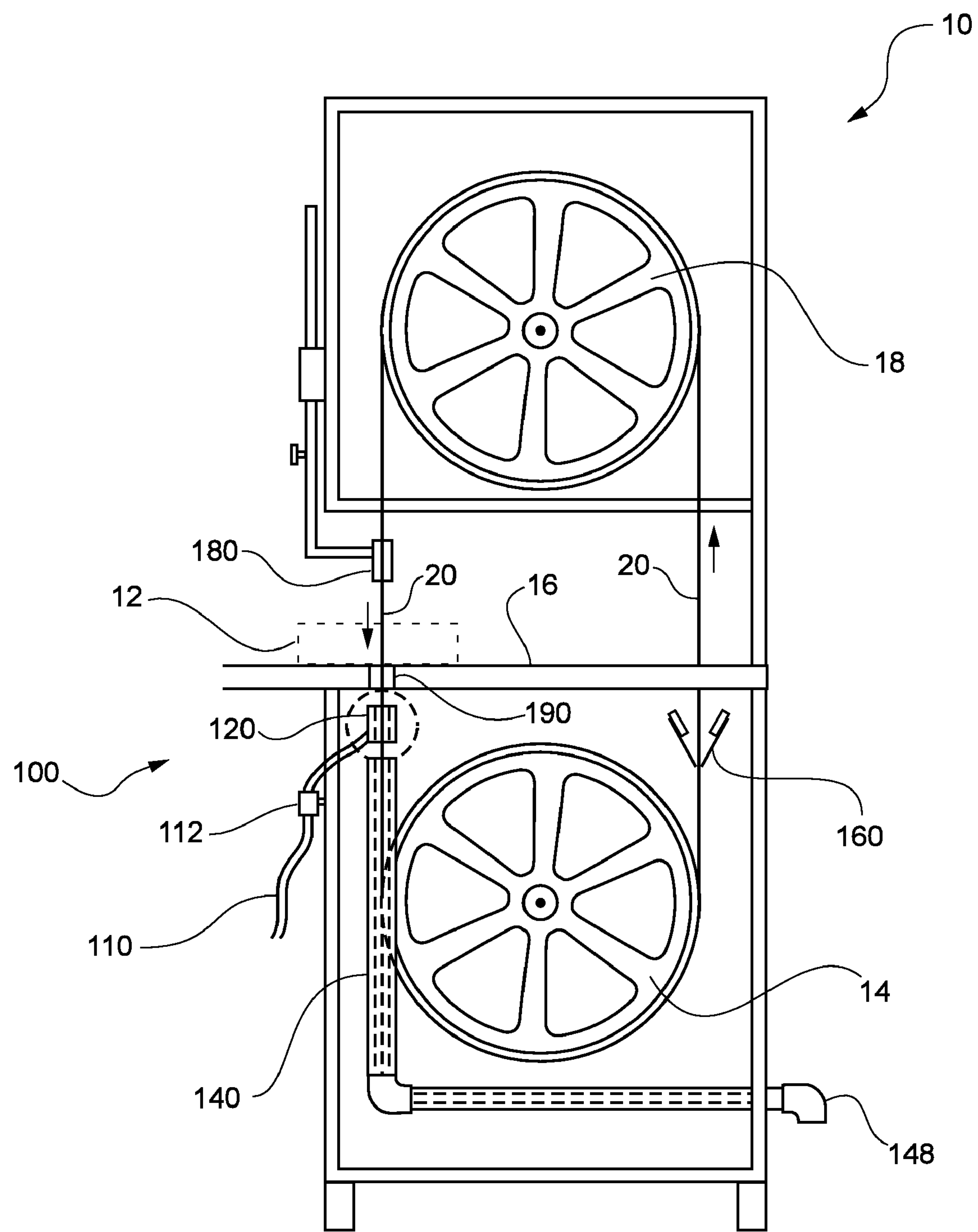
FIG. 1 illustrates a front schematic view of a meat-cutting band saw having a system for removing physiological material on the surfaces of cut meat, in accordance with an exemplary embodiment of the present invention.

The following detailed description of the invention makes reference to the accompanying drawings, which form a part thereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. As such, the following more detailed description of the exemplary embodiments of the present invention is not intended to limit the scope of the invention as it is claimed, but is presented for purposes of illustration only: to describe the features and characteristics of the present invention, and to sufficiently enable one skilled in the art to practice the invention. Accordingly, the scope of the present invention is to be defined solely by the appended claims.

The present invention describes a system and method for removing physiological material on the surfaces of cut meat that can be used with meat-cutting band saws. The system can include a water jet manifold having nozzle orifices formed therein for directing jets of water across and into the moving side surfaces of the endless band saw blade. The manifold can be located underneath the cutting surface of a band saw, so that the water jets can immediately wash away residual physiological material captured in the cutting teeth or on the knife surfaces of the saw blade. The water jets can also act to cool the saw blade to remove any frictionally-induced heat generated by contact between the saw blade and the meat at the cutting interface. Furthermore, the water jets can deposit a film of water, a desired portion of which can remain on the saw blade's side surfaces and cutting edge as it travels around the band saw to provide lubrication during the next cutting cycle. The volume or thickness of the film of water deposited on the saw blade can be controlled with a scraper and/or saw guides to provide the optimal cooling and lubrication at the cutting interface while minimizing the amount of water transferred from the blade to the cutting surface.

The system and method can also include a waste receiver mounted opposite the manifold to capture the water and residual physiological material carried on the band saw blade that is redirected by the water jets. The waste receiver prevents both the water and residual physiological material from falling to the bottom of the band saw enclosure and creating a safety or sanitary hazard. The waste receiver can include a filter to remove the residual physiological material from the stream of waste water.

The system and method of the present invention can provide several significant advantages over prior related band saw cleaning devices, some of which are recited here and throughout the following more detailed description. For instance, the system and method can substantially reduce the amount of residual physiological material that is carried by a band saw blade and which can be subsequently transferred to the surface of the cut meat. As discussed hereinabove, limiting the amount of residual physiological material transferred to the meat surface can minimize bacterial growth and allow the meat to remain fresh and appetizing for a longer period of time.

The system and method can also be used to lubricate and cool the endless saw blade, which has the effect of reducing the localized denaturing effects and heat damage that a saw blade can impart to the surface of the cut meat. This can lead to the substantially improved appearance and perceived value of the cuts of meat created using a band saw equipped with the system of the present invention.

The system and method can be further advantageous with the capacity for effective utilization on band saws having bone cutting blades as well as bands saws having with knife blades.

Each of the above-recited advantages will be apparent in light of the detailed description set forth below and best understood with reference to the accompanying drawings, wherein the elements and features of the invention are designated by numerals throughout. These advantages are not meant to be limiting in any way. Indeed, one skilled in the art will appreciate that other advantages may be realized, other than those specifically recited herein, upon practicing the present invention.

With reference to FIG. 1, illustrated is a front schematic view of a meat-cutting band saw 10 having a system 100 for removing physiological material on the surfaces of cut meat, in accordance with an exemplary embodiment of the present invention. The band saw can include two rotating wheels or pulleys, such as a drive pulley 14 and a guide pulley 18. A band saw blade 20 is coupled around the wheels to allow the blade to ascend or descend as the wheels are rotated. At least one of the wheels (or drive pulley) is rotated by an electric motor or similar powering device. The motor may have multiple or variable speeds. Alternatively, the motor may be configured to operate at a single speed. The blade can be directed through a slotted cutting surface 16 on which meat can be placed. The meat can be guided along the cutting surface towards the teeth of the band saw blade 20 as the saw blade descends downward through the cutting zone 12. The band saw can further include various other features that are not shown, such as a guide to direct meat past the blade, guards to protect the user, and so forth.

As typically configured, the wheels 14, 18 are rotated in a direction that allows the blade to descend through the cutting surface 16 in the cutting zone 12. As meat is directed at the blade, the meat is cut as the blade descends through the cutting surface, around the wheels, and back down through the cutting surface. Various byproducts of the meat, such as portions of muscle, fat, blood, bone, and bone marrow, can build up on the side surface surfaces of the blade 20 and within the teeth of the blade. This build-up of residual physiological material travels on the blade as it rotates around the wheels. Some of the residual material is then transferred back from the blade onto the surfaces of the cut of meat.

Most meat cutters scrape the surfaces of the meat after it has been cut to remove the residual physiological material that has been transferred from the surface of the blade onto the surface of the meat. In theory, both sides of the cut of meat should be scraped to remove as much of the residual material as possible. However, scraping both sides of each cut of meat can be time consuming. In practice, most meat cutters typically scrape only a single side of the meat and place the meat in the package with the scraped side facing up so that it appears more appealing to a consumer. As can be appreciated, however, the non-visible unscraped side of the meat can still cause the meat to age and discolor prematurely.

Furthermore, even scraping the cut of meat is of limited benefit, since a portion of the residual material will still remain on the surface. This residual material can cause discoloration of the meat and significantly increase the rate of bacterial growth on the surface of the meat, thereby reduce its shelf life and requiring the meat to be disposed of within a relatively short period. This short shelf life can result in a relatively high rate of product loss if the meat cannot be sold shortly after it is cut, as meat resellers typically remove cuts of meat from their displays after approximately two to three days. This high rate of product loss reduces the profits of the meat cutter and increases the overall cost of the meat cuts to the consumer.

As previously discussed, scraping the surface of the endless band saw blade can remove some residual physiological material from the portion of the blade behind the teeth. However, some of the residual material remains on the surface of the blade even after scraping. Additionally, physiological material caught on surfaces of the teeth of the blade typically is not removed since many of the surfaces of the teeth are orthogonal to a scraper and therefore don't come in contact with the scraper. Furthermore, bone saw blades are designed such that the teeth are alternately directed forward and backward with respect to the surface of the blade. This allows the blade to more easily cut through bone material in the meat. Since the teeth are not in the same plane as the surface of the blade, the teeth would quickly erode or shred a solid scraper. Therefore, the teeth of a bone saw blade can contain relatively large amounts of residual material since they cannot be scraped.

To overcome the problems caused by the residual material that is transferred to the meat, it has been discovered that water jets can be directed across each side surface of the saw blade. Water has historically not been used around meat cutting areas. The stereotypical meat cutting plant has used sawdust to absorb the blood and other residual physiological material that is discharged when the meat is cut on a band saw. Thus, the use of water to clean a meat cutting blade could not have occurred, as the water would have quickly made a large, unsanitary mess when combined with the sawdust. However, recent changes to the practice of meat cutting have eliminated the use of sawdust. Thus, water can now be used to remove the residual physiological material from the blade.

As shown in FIG. 1, the system for removing physiological material on the surfaces of cut meat can include a water jet manifold 120 having two nozzle orifices formed therein and orientated for directing jets of water across and into both side surfaces and the cutting edge of the endless band saw blade 20. The manifold can be located underneath the cutting surface 16 of the band saw, so that the water jets can wash away residual physiological material shortly after it is captured in the cutting teeth or on the knife surfaces of the saw blade. The water jet manifold can be coupled to a source of pressurized water with a hose 110 or piping, which can in turn include a throttle valve 112 or similar flow control device to reduce the pressure of the water entering the nozzle orifices.

The reduced water pressure can be desirable to both reduce the velocity of the jets and control the volume of water as the jets are directed across the moving side surfaces and cutting edge of the saw blade 20. As will be discussed in more detail below, it has been discovered that unpredictable benefits, such as a significant reduction in the amount of physiological material transferred to the surfaces of the cut meat, can result with a reduction in water jet velocity and with a water jet orientation directed across, rather than down, the moving axis of the saw blade. Although the exact physical mechanism remains uncertain, it is hypothesized that the reduced flow and horizontal orientation of the jet of water encourages a greater wetting of the saw blade and formation of a thin film or layer of water, which in turn improves cooling and lubrication and inhibits the build-up of excess residual material on the saw blade.

The system can further include a waste receiver 140 mounted on an opposite side of the blade as the manifold to capture the jets of water and any physiological material emitted when the meat is cut with the band saw and redirected by the water jets, so as to prevent both the water and emitted physiological material from falling to the bottom of the band saw enclosure and creating a safety hazard and non-sanitary slug. The waste receiver can include a filter to remove the emitted physiological material contained in the stream of waste water, as well as an outlet 148 for removing the waste water for proper disposal.

The system can also include a scraper 160 and/or an upper blade guide 180 which can control the volume or thickness of the film or layer of water on the side surfaces and cutting edge of the saw blade, as the saw blade is moved up, around and down by the rotating wheels.

As illustrated in more detail in FIGS. 2*a*-2*c*, the water jet manifold 120 can include a first nozzle orifice 126 that operates to direct a jet of water 106 onto a first side surface 26 of the saw blade, and a second nozzle orifice 128 that operates to direct a jet of water 108 onto a second side surface 28 of the saw blade as the saw blade 20 is rotated about the wheels of the band saw. In the embodiment shown, the water jet manifold 120 can be comprised of a solid block 122 of material, such as stainless steel or high-grade thermoplastic, with an inlet cavity 130 formed along the horizontal centerline and open at one end with a threaded interface 132. The threaded interface 132 can allow the manifold block 122 to be coupled to the source of pressurized water via an inlet hose 116 with a threaded coupler 118. Both the first and second nozzle orifices 126, 128 can be formed in a front face 124 of the manifold block 122 and extend inwards to establish fluid communication with the inlet cavity 130, so that pressurized water reaching the inlet cavity from the source of pressurized water can exit through the nozzle orifices 126, 128 in the form of water jets 106, 108.

The first and second nozzle orifices 126, 128 can be offset a distance d from the plane of the saw blade (y-z), and orientated to direct the jets of water 106, 108 across and into the saw blade 20 at a relatively shallow angle $\phi$ with respect to the side surface 26, 28 of the saw blade. The shallow angle $\phi$ allows the water jets to contact the blade with sufficient force to dislodge residual physiological material from both the side surfaces 126, 128, and from the cutting edge 22 or teeth 24 of the saw blade, and then flow into the waste receiver with minimal splashing of the water outside of the waste receiver. The inward angle $\phi$ can range from about 5 degrees to about 45 degrees with respect to the side surfaces 26, 28 of the saw blade 20. In one embodiment, the water jets 106, 108 can be directed inward at the side surfaces of the saw blade 20 at an angle of approximately 45 degrees with respect to the side surfaces 26, 28.

The first and second nozzle orifices 126, 128 can also be orientated to direct the jets of water 106, 108 at a downward angle $\theta$ relative to a normal that is orthogonal to the saw blade's 20 direction of travel. Directing the jets of water at a downward angle $\theta$ can increase the amount of residual physiological material that is removed from the teeth 24 of the band saw blade 20. The downward angle $\theta$ can range from about 5 degrees to about 45 degrees with respect to a normal that is orthogonal to the saw blade's 20 direction of travel. In one embodiment, first and second nozzle orifices 126, 128 may be orientated at a downward angle $\theta$ that allows the jets of water to exit the nozzle orifices at an angle that approximates the downward angle of the teeth 24 on the saw blade 20 relative to a normal that is orthogonal to the blade's direction of travel. In another embodiment, the nozzle orifices can be orientated at a downward angle $\theta$ of approximately 45 degrees with respect to a normal that is orthogonal to the blade's direction of travel.

The water jet manifold 120 can be configured to emit the water from the back of or from behind the saw blade 20 toward the front cutting edge 22. Emitting the water in this direction can be helpful in removing residual physiological material that is snagged on the sharp edges of the teeth. However, emitting the water in the opposite direction, from the cutting edge side 22 or front of the saw blade toward the back side of the blade, is also considered to be within the scope of the present invention.

Figures 3, 5:
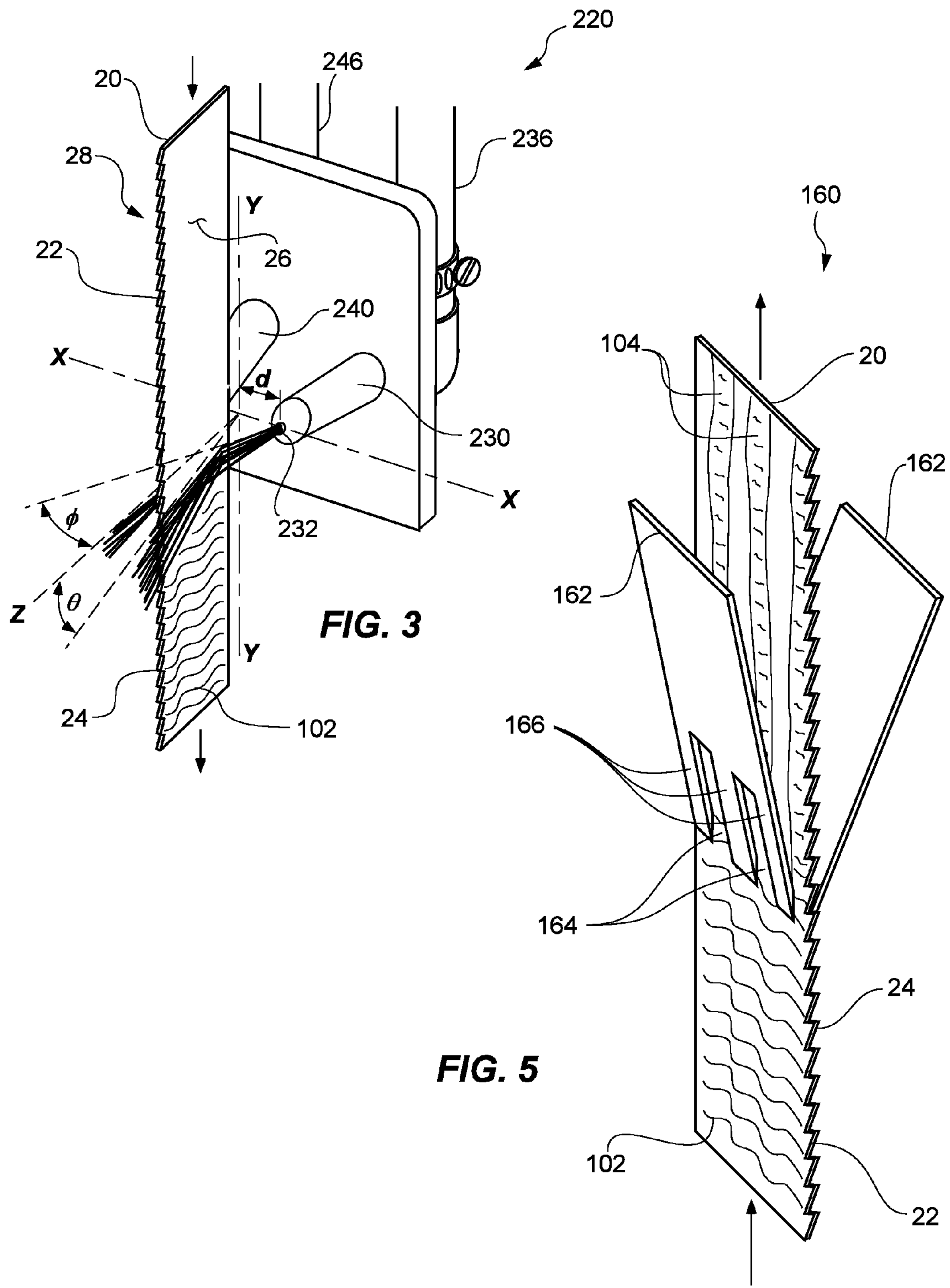
FIG. 3 illustrates a perspective schematic view of a water jet manifold, in accordance with another embodiment of the present invention.
FIG. 5 illustrates a perspective schematic view of a scraper, in accordance with the embodiment of FIG. 1.

In an alternative embodiment, as illustrated in FIG. 3, the water jet manifold 220 may comprise two separate nozzles 230, 240, that can provide the user with the option of connecting the nozzles to common or separate sources of water 236, 246. Moreover, the water jet manifold 220 can allow the each nozzle 230, 240 to be separately adjustable, both with regards to the orientation of the nozzle orifices 232, 242 and with regards to the opening size of the nozzle orifices 232, 242, so as to allow individual control of the velocity and volume of water of each jet as they are directed across the moving side surfaces 26, 28 and cutting edge 22 of the saw blade 20.

As illustrated in both embodiments, the water jet manifold 120, 220 can allow the nozzle orifices to be located at a relatively close distance to the saw blade 20, thereby enabling the water jets to be more effectively directed at the blade with minimal loss of water. In one embodiment, the exit of each nozzle orifice can be located at a distance of less than one inch from the saw blade 20. In another embodiment, the exit of each nozzle orifice can be located at a greater distance, such as greater than six inches. The actual distance between the saw blade and the location of the water jet manifold can be dependent on the type of band saw, such as the commercial model or the manufacturer of the band saw, to which the system and method of the present invention is applied.

Referring back to FIGS. 1 and 2*a*-2*c*, the water jet manifold 120 can be connected directly to a culinary water source (not shown) via a water pipe or tubing 110. Alternatively, the water jet manifold 120 may be connected to a water pressurization system (also not shown) such as a pressure sprayer. The water source can be a source that is substantially sterile.

During the process of reducing the system and method of the present invention to practice, the inventors at first assumed that a relatively low volume of water emitted from the first and second nozzle orifices 126, 128 at a relatively high pressure would optimally reduce and eliminate the residual physiological material from the side surfaces 26, 28 and cutting edge 122 of the saw blade while minimizing water usage and overspray. However, after running dozens of experiments, it was discovered that water emitted from the nozzle orifices at a lower pressure and at a greater volume (higher flow rate) worked better to keep the side surfaces 26, 28 and cutting edge 22 of the saw blade substantially free from residual physiological material, thereby significantly reducing the amount of residual physiological material transferred from the blade 20 to the surfaces of the meat cut using the band saw 10.

The residual physiological material, especially the material consisting of bone dust and bone marrow, can form a relatively sticky material with a tight bond to the side surfaces 26, 28 of the saw blade 20. The superior functioning of lower pressure water jets with a higher volume to clean the residual physiological material from the side surfaces 26, 28 and teeth 24 was contrary to expected results. It was discovered that even with the water jets at a relatively high pressure, removal of the sticky residual material from the band saw blade was difficult. However, when a higher volume of water at lower pressure was applied to the blade, the band saw blade became much cleaner, with substantially all of the physiological residual material removed from the blade.

The inventors hypothesize that the lower pressure water jets are better able to maintain a saw blade that is relatively free of residual physiological material due to a thin layer of water 102 that is carried on the blade as it travels around the wheels 14, 18. It is believed that the thin layer of water acts as a lubricant as the blade is passed through the meat, fat, bone and other physiological materials. Through experimentation, it has been observed that the thin layer of water 102 substantially reduces the amount of residual physiological material that adheres to the cutting edge 122 and side surfaces 126, 128 of the saw blade 20 during the meat cutting process. The material which does adhere, such as small particles of meat, fat, and connective tissue, can still be substantially removed from the blade by the lower pressure water jets emitted from the first and second nozzle orifices 126, 128. Thus, the lower pressure, higher volume flow of water is better able to reduce the amount of physiological material that is carried on the surfaces off the blade, thereby providing the unexpected results.

In addition to the lubrication effect caused by the larger flow of water, it is thought that the water can also have a beneficial effect of cooling the blade. Over time, when a plurality of cuts of meat are made using the band saw 10, friction between the band saw blade 20 and the meat can cause the temperature of the blade to substantially increase. This is especially true when cutting meat having a high bone content, such as ribs or t-bone steaks. As previously discussed, the heat from the blade can cause the muscle, fat, and other physiological material near the blade to denature. This denaturing process can increase bacteria growth and reduce the shelf life of the cuts of meat. The application of the water jets 106, 108 to the blade can have an add benefit of cooling the blade to minimize any denaturing effect that occurs due to the heating of the blade. In one embodiment, the water applied to the blade with the first and second nozzle orifices 126, 128 can be set at a temperature that allows the band saw blade to be cooled sufficiently to reduce denaturing of physiological material that is proximate to the band saw blade on the cut meat. Typically this temperature can be the standard temperature of the culinary water. However, in some situations it may be necessary to chill the water prior to its use.

The actual amount of water volume and the pressure of the water within the first and second nozzle orifices 126, 128 can vary depending upon system requirements and installation location. A wider blade may require a greater volume of water to remain substantially free of residual physiological material as it rotates around the wheels 14, 18. Certain cuts of meat, such as meat with a large amount of bone material, may also require a higher volume of water. The inventors have found that a water pressure of 40-60 psi emitted from each nozzle orifice at a rate of approximately 1 gallon per minute was sufficient keep the blade 20 substantially free from residual material while cutting meat such as t-bone steaks and ribs. In some installation locations, a pressure reduction valve 112 may be needed to obtain a desired pressure level to allow a sufficient amount of water to be emitted that allows the blade to be coated with the thin layer of water 102 to provide the sought-after lubrication, as previously discussed.

Figures 4A, 4B:
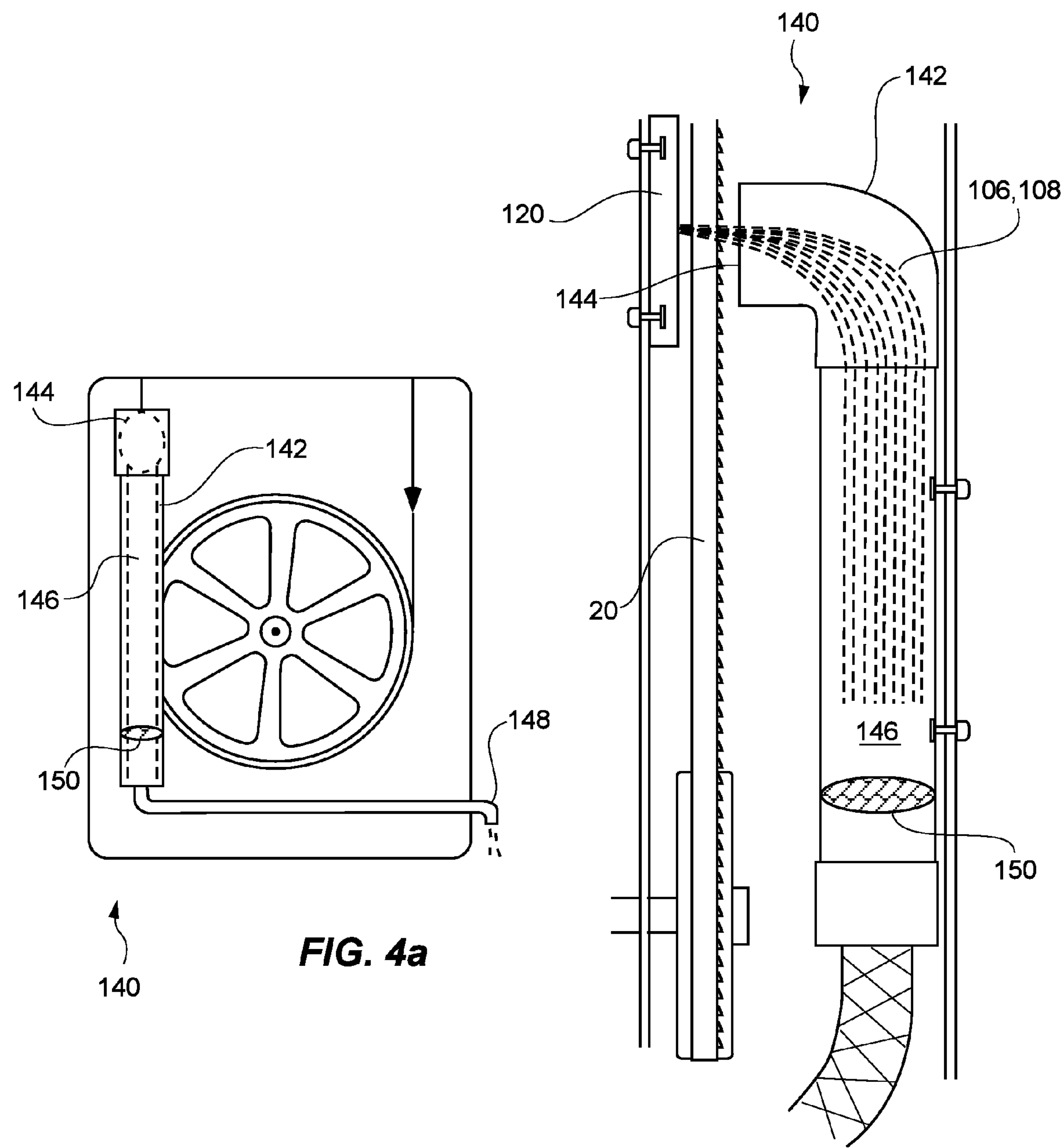
FIG. 4*a* illustrates a front schematic view of a waste receiver, in accordance with the embodiment of FIG. 1.
FIG. 4*b* illustrates a side schematic view of the waste receiver of FIG. 4*a;*

Referring now to FIGS. 4*a* and 4*b*, a waste receiver 140 can be used to receive the water emitted from the water jet manifold 120. The waste receiver can be a tube 142, a pipe, a funnel, a trough, or another means having an opening 144 for receiving the water jets emitted from the nozzle orifices 126, 128 onto the surfaces of the blade 112 and a passage 146 for directing the water away from the cutting area. While FIG. 1 shows the water jet manifold 120 with nozzle orifices mounted behind the saw blade and directing the jets of water across the saw blade 20 toward the waste receiver 140 located in front of the band saw 10, it is also possible to reverse the component locations and direct the water jets from in front of the blade towards the back of the saw blade.

The waste receiver 140 was, at first, mounted substantially near the blade 20 to minimize loss of water between the nozzle orifices 126, 128 and the waste receiver 140. However, in this arrangement it was discovered that a fairly large amount of falling residual physiological material thrown off from the meat cutting process could accrue on the waste receiver. For instance, after several minutes of cutting a relatively large pile of residual material tended to build up on top of the receiver located just below the slot in the cutting surface. When the waste receiver was moved farther from the blade, it was observed that this falling residual material was advantageously redirected by the water jets emitted from the nozzle orifices 126, 128. Rather than falling directly on the floor, as typically occurs in the cutting process, the residual material was instead redirected by the water jets into the waste receiver 140.

The waste receiver 140 can have an outlet 148 that is coupled to or located proximate to a standard drain. Alternatively, the waste receiver may store the water and residual material in a holding container. The residual material that enters the waste receiver 140 is typically of a relatively small size, and may be flushed down the drain along with the water emitted from the water jet manifold 120. Alternatively, a residual material filtering screen 150 may be used to remove the residual material from the water. The screen may be located within the waste receiver, as illustrated in FIG. 1. When cutting heavy quantities of meat, the filtering screen may become clogged, thereby backing up the waste receiver. Therefore, the screen may be located outside and below the waste receiver outlet 148. The residual material that is removed at the filter 150 can simply be disposed of along with other meat scraps. In an alternative embodiment, an active system such as a garbage disposal may be used to grind the residual material down to an acceptable size and allow the material to be flushed down the drain along with the water from the water jets. The disposal may be located within the waste receiver, between the waste receiver and the drain, or within the drain system itself While the waste receiver 140 is illustrated in FIG. 1 as a pipe 142, various other configurations are considered to be within the scope of the present invention. For example, the waste receiver may be open at a top end to form a gutter through which the waste water and residual material can flow. In another embodiment the tube of the waste receiver can be configured with a notch or groove to fit around the saw blade, so that the blade can pass through the opening 144 in the waste receiver. The waste receiver can thus substantially confine any spray that occurs when the water jets contact the saw blade. In another embodiment, plastic guards can be placed on either side of the blade to form a column through which the water from the jets and the residual material can flow and the water can be collected in an area below the blade. It is to be appreciated that other types of waste water and residual material collection schemes that minimize spray from the water jets and effectively collect the waste water and residual material are considered to be within the scope of the present invention.

Illustrated in FIG. 5 is a scraper 160 which can be installed about the upwardly moving saw blade (or the upward flight). Unlike scrapers installed in prior art band saws used for cutting meat, the scraper 160 may not configured to scrape off residual physiological material attached to the saw blade 20, since much of the residual material has already been removed by the water jets emitted from the water jet manifold. Instead, the scraper 160 can be used to control the thickness or volume of the layer of water deposited onto the saw blade with the water jets. It is believed that the ability of the layer of water to remain on the blade during the remainder of the saw blade's movement up and over the upper wheel 18 (see FIG. 1) can be improved if the thickness or volume of the layer of water traveling with the saw blade is reduced. It is also conceived that the cooling and lubrication benefits of the layer of water may be further improved if the layer of water remains thin.

As shown in FIG. 5, the thickness of the layer or film of water on the saw blade can be controlled by forming water channels 164 or grooves in the scraper plates 162, which water channels can allow a portion of the layer of water 102 to pass untouched by the scraper 160 while the remainder of the water is substantially removed. The water channels 164 can divide the end of the scraper plates 162 into finger-like projections 166 with sharp bottom edges that can strip off portions of the layer of water. Thus, the layer of water 102 only remains on the strips of the saw blade 104 passing under the water channels, in addition to the cutting edge 22 or teeth 24 of the blade which can remain un-touched by the scraper 160. With much of the water removed by the finger-like projections 166, it is believed that the remaining water on the saw blade, in response to the movement of the blade around the upper wheel, quickly flows and spreads out to form a layer or film of water on the side surfaces of the saw blade having a substantially reduced thickness relative to the thickness of the layer of water prior to the scraper 160. Furthermore, controlling the width of the water channels in proportion to the overall width of the saw blade can be an effective method of manipulating the thickness of the layer of water on the saw blade, prior to the saw blade re-entering the cutting zone.

Figures 6A, 6B, 6C:
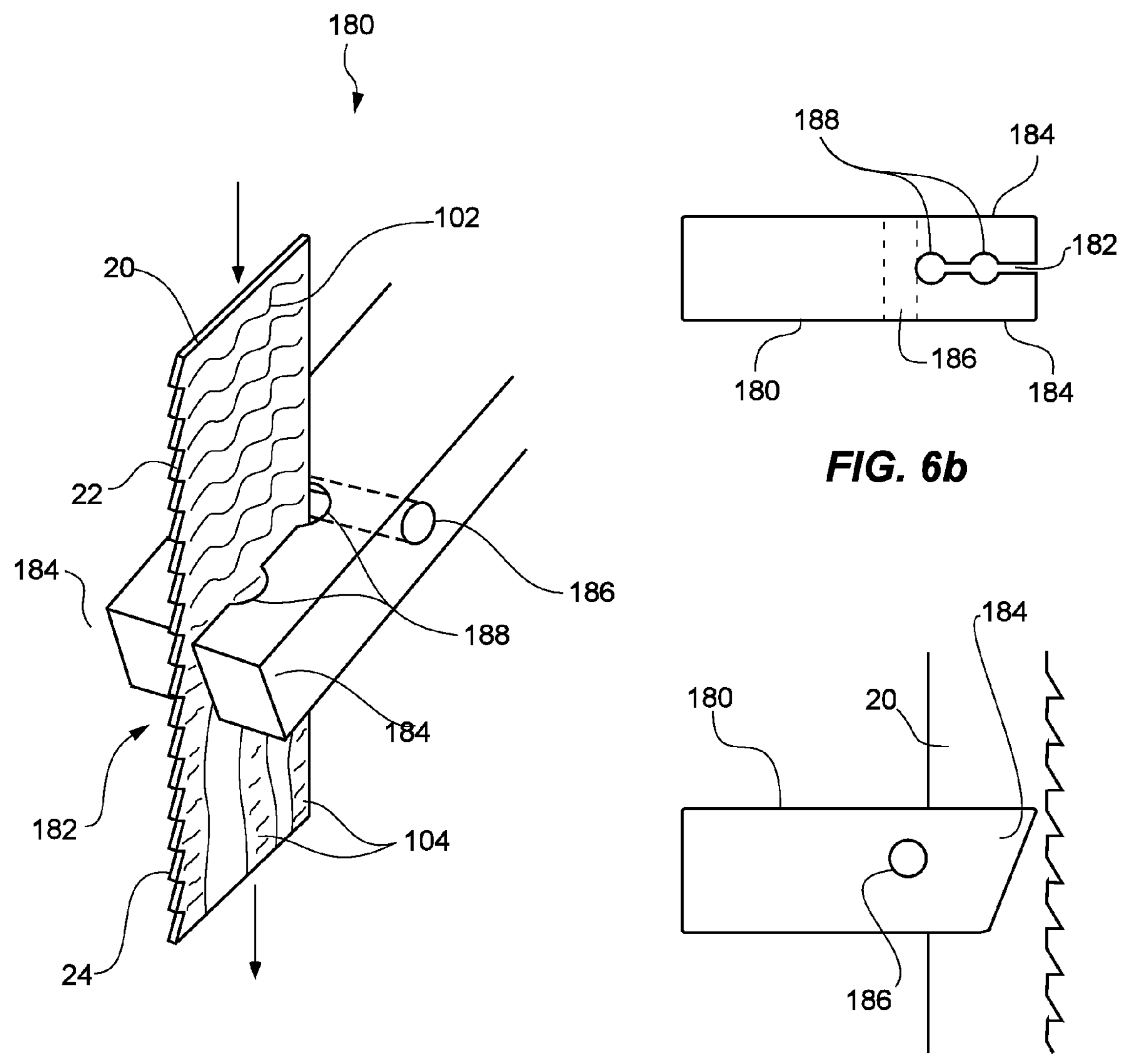
FIG. 6*a* illustrates a perspective schematic view of an upper blade guide, in accordance with the embodiment of FIG. 1.
FIG. 6*b* illustrates a top view of the blade guide of FIG. 6*a;*
FIG. 6*c* illustrates a side view of the blade guide of FIG. 6*a*.

The upper blade guide 180, shown in more details in FIGS. 6*a*-6*c*, can be modified to function in a similar manner. A common component with band saws, the upper blade guide 180 typically operates to align and hold the saw blade 20 in position as the saw blade rolls around the top of the upper wheel 18 and travels downward to enter the cutting zone 12. (see FIG. 1). The upper blade guide can include a slotted section 182 for receiving the moving saw blade 20 that divides the forward portion into two side sections 184 that can prevent excessive lateral or side-to-side movement of the saw blade. The upper blade guide can also include a tungsten carbide (or similar hardened material) insert 186 that can be placed in the back of the slot 182 to prevent the back edge of the saw blade from digging deeper into the slot as pressure is applied to the front cutting edge 22 during the cutting process.

The slot 182 of a standard upper blade guide 180 can be provided with sufficient clearance to prevent the teeth 24 on the cutting edge 22 of the saw blade from cutting into and damaging the blade guide during the cutting process. This clearance may be sufficient to allow the layer of water 102 to remain on the blade during unloaded rotation of the saw blade. Alternatively, the guide may be configured to direct the portion of the blade behind the teeth. During cutting operations the saw blade can often be pushed into one or the other side sections 184, which could inadvertently scrape off and remove the layer of water 102 on one of the side surfaces 26, 28 of the saw blade prior to reaching the cutting zone. To prevent the complete removal of the film or layer of water, water channels 188 also can be formed in the side sections 184 of the upper blade guide to ensure that sufficient water 104 remains on the side surfaces of the saw blade to provide the sought-after lubrication.

An additional lower blade guide 190 (FIG. 1) can be located flush with the plane of the cutting surface 16. Water channels similar to the water channels 188 formed in the upper blade guide 180 can be placed in the lower blade guide to allow water and residual physiological material on the blade to pass through the slots.

The water jet manifold 120 (FIG. 1) can also include hardened metal inserts, such as tungsten carbide, (not shown) that prevents or reduces the risk of the blade puncturing the inlet cavity 130 when the blade is pushed during the cutting process.

Figure 7:
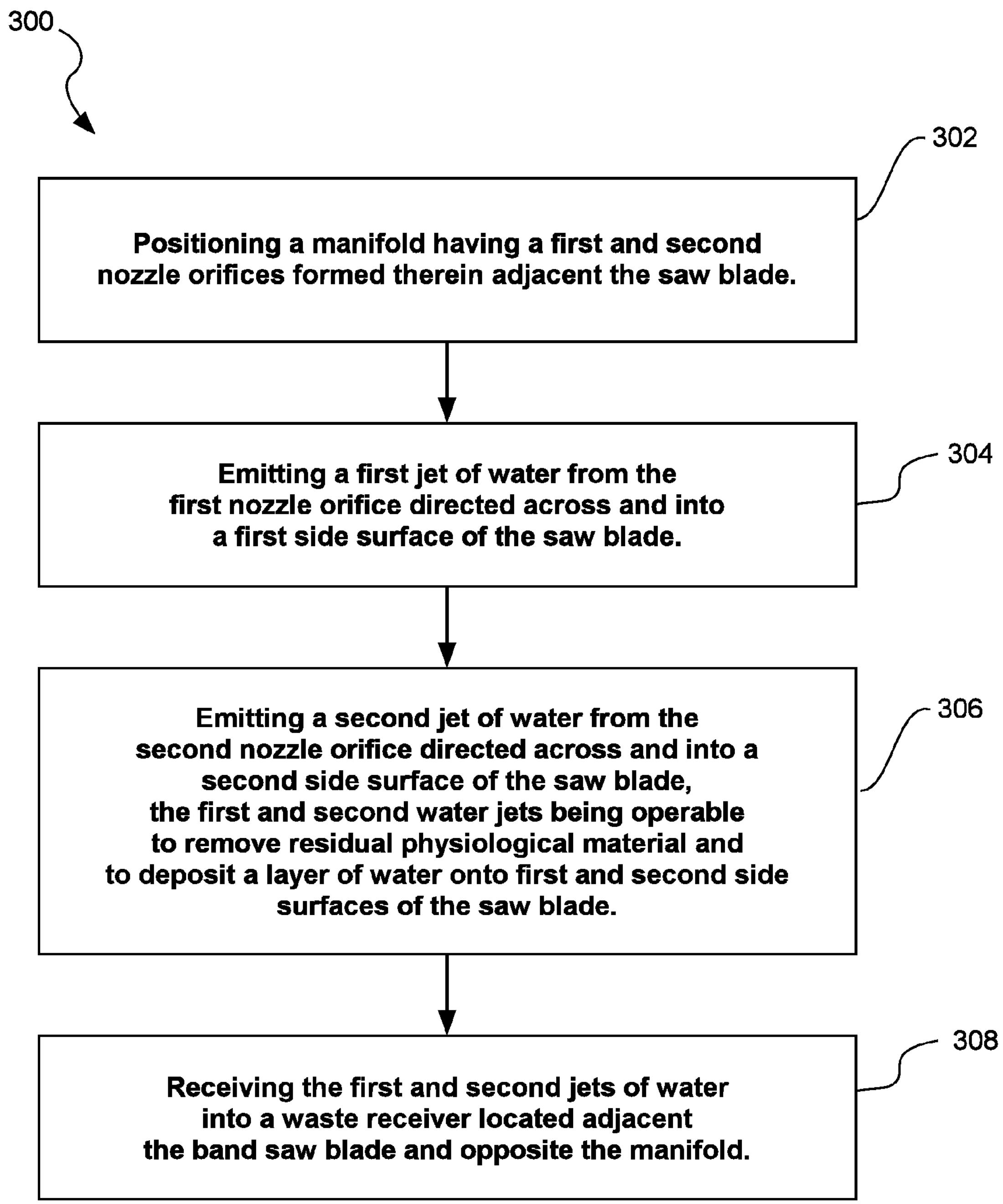
FIG. 7 is a flowchart depicting a method for reducing residual physiological material transferred to surfaces of cut meat by an endless band saw blade, in accordance with another exemplary embodiment of the present invention.

A flowchart depicting a method 300 for reducing the residual physiological material transferred to surfaces of cut meat by an endless band saw blade is illustrated in FIG. 7. The method can include positioning 302 a manifold having a first and second nozzle orifices formed therein adjacent the saw blade, emitting 304 a first jet of water from the first nozzle orifice directed substantially across and into a first side surface of the saw blade, and emitting 306 a second jet of water from the second nozzle orifice directed substantially across and into a second side surface of the saw blade, the first and second water jets operating to remove residual physiological material and to deposit a layer of water onto first and second side surfaces of the saw blade. The method can further include receiving 308 the first and second jets of water into a waste receiver located adjacent the band saw blade and opposite the manifold.

As can be appreciated by one of skill in the art, the system and method of the present invention, as generally illustrated in FIG. 1, can include a holistic approach to the band saw system, involving both the addition of new components 120, 140 and the modification of existing components 160, 180 to ensure that a layer of water having the desired thickness and volume is present on both sides surfaces and on the cutting edge of the saw blade 20 prior to the blade entering the cutting zone 12. Unlike prior art systems which focus solely on the removal of residual physiological material from the saw blade using high-velocity jets or blunt force scraping, the present invention achieves results that had heretofore been unpredicted by using low-velocity, high-volume jets of water to clean, cool and lubricate the saw blade to reduce the adherence of residual physiological material to the saw blade in the first place.

In addition, the amount of water on the blade and near the band saw is carefully controlled using a novel waste receiver 140 located adjacent the water jet manifold 120, scraper 160, and blade guides 180. The ability to control the water flow can be critical in the usefulness of the invention. Too much water, or water directed towards rapidly moving parts such as the wheels 14, 18, can create a water maelstrom within an operating meat saw. This maelstrom can cause water to be deposited on the surrounding floor and the meat cutting surface, resulting in hazardous working conditions. In addition, even when excess water from the orifices 126, 128 is collected, too much water located on the blade can cause water to collect and rain down from the upper wheel 18 and upper housing section of the band saw. With the waste receiver 140, the scraper 160 and the blade guides 180, however, the level of water can be carefully controlled to reduce or eliminate undesired water from building up, pooling, or raining down from the system. This improves the safety and sanitary conditions of the meat cutting saw when using the system. Thus, the ability to control the water flow further provides a useful system and method for reducing residual physiological material transferred to surfaces of cut meat by an endless band saw blade.

In summary, by reducing the build-up of residual physiological material on the saw blade during the meat cutting process and by removing most of the remaining residual material that does collect on the blade, a band saw equipped with the water jets described in the present application can minimize the amount of residual physiological material that is subsequently transferred to the cut surfaces of the meat. As a result, both the appearance of the freshly cut meat can be improved and future bacteria growth can be significantly limited, enabling the cut of meat to remain fresh and appetizing for a longer period of time. The extended shelf life of the meat cut using the system and method of the present invention, as compared with meat cut using the industry standard dry cutting processes, can lead to reduced product loss at the meat cutters, greater profits for the meat re-seller, and lower prices for the consumer.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed is:

1. A system for reducing residual physiological material transferred to surfaces of cut meat by an endless band saw blade, comprising:

a water source;

a manifold positioned adjacent the saw blade and having a first and second nozzle orifices formed therein, wherein the first and second nozzle orifices are in fluid communication with the source of water;

a first water jet directed by the first nozzle orifice, wherein the first nozzle orifice directs the first water jet onto a first side surface of the saw blade; and a second water jet directed by the second nozzle orifice, wherein the second nozzle orifice directs the second water jet onto a second side surface of the saw blade, wherein the first and second water jets direct a sufficient volume of water onto the saw blade to remove at least a portion of the residual physiological material and to deposit a layer of water onto the first and second side surfaces of the saw blade, the layer of water forming a lubricant to provide lubrication to reduce the residual physiological material that adheres to the saw blade, thereby reducing the residual physiological material transferred to the surfaces of cut meat by the saw blade; and a blade guide operable to guide the endless band saw blade, the blade guide having a slot to receive a back portion of the endless band saw blade, with at least one water channel formed in the slot, the at least one water channel formed in side sections of the blade guide and passing through the slot, the at least one water channel having a width and a length, the length extending along the first and second side surfaces of the endless saw blade in a direction substantially parallel to the saw blade's direction of travel to enable at least a portion of the layer of water on the first and second side surfaces to pass through the at least one water channel in the blade guide to provide the lubrication.

2. The system of claim 1, wherein the first and second water jets are controlled to a temperature that cools the saw blade sufficiently to reduce denaturing of physiological material on the surface of the cut meat proximate to the saw blade.

3. The system of claim 1, wherein the first and second nozzle orifices are formed into a front face of a manifold block.

4. The system of claim 1, wherein the first and second nozzle orifices are positioned to direct the first and second jets of water respectively at a downward angle that is approximately an angle of teeth on the saw blade relative to a normal that is orthogonal to the saw blade's direction of travel.

5. The system of claim 1, wherein the first and second nozzle orifices are positioned to direct the first and second jets of water respectively at a downward angle ranging from about 5 degrees to about 45 degrees relative to a normal that is orthogonal to the saw blade's direction of travel.

6. The system of claim 1, wherein the first and second nozzle orifices are positioned to direct the first and second jets of water respectively at an inward angle ranging from about 5 degrees to about 45 degrees with respect to the first and second side surfaces of the saw blade.

7. The system of claim 1, further comprising a waste receiver located adjacent the saw blade and opposite the first and second nozzle orifices to receive the water emitted from the first and second nozzle orifices and direct the water into a drain.

8. The system of claim 7, wherein the manifold is located behind the saw blade and the waste receiver is located in front of the saw blade.

9. The system of claim 7, wherein the manifold is located in front of the saw blade and the waste receiver is located behind the saw blade.

10. The system of claim 7, wherein the waste receiver is located at a sufficient distance from the saw blade that residual material emitted when meat is cut with the band saw is redirected by the first and second water jets into the waste receiver.

11. The system of claim 1, wherein the endless band saw blade is a knife blade.

12. The system of claim 1, wherein the endless band saw blade is a bone saw blade.

13. The system of claim 1, further comprising a scrapper for stripping off a portion of the layer of water from the first and second side surfaces to control the volume of the layer of water on the saw blade.

14. A system for reducing residual physiological material transferred to surfaces of cut meat by an endless band saw blade, the system comprising:

a water source;

a manifold block located adjacent the saw blade and having a front face with first and second nozzle orifices formed therein, wherein the first and second nozzle orifices are in fluid communication with the source of water;

a first water jet directed by the first nozzle orifice, wherein the first nozzle orifice directs the first water jet onto a first side surface of the saw blade;

a second water jet directed by the second nozzle orifice, wherein the second nozzle orifice directs the second water jet onto a second side surface of the saw blade, to remove at least a portion of the residual physiological material and to deposit a layer of water onto the first and second side surfaces of the saw blade;

a blade guide operable to guide the endless band saw blade, the blade guide having a slot to receive a back portion of the endless band saw blade, with at least one water channel formed in the slot, the at least one water channel formed in side sections of the blade guide passing through the slot, the at least one water channel having a width and a length, the length extending along the first and second side surfaces of the endless saw blade in a direction substantially parallel to the saw blade's direction of travel to enable at least a portion of the layer of water on the first and second side surfaces to pass through the at least one water channel in the blade guide to provide lubrication; and a scraper having at least one scraper water channel formed in an end of the scraper contacting a side surface of the saw blade to allow a portion of the layer of water from the first and second side surfaces to pass through the at least one scraper water channel to control a volume of the layer of water on the saw blade.

15. The system of claim 14, wherein the scraper further comprises:

a first scraper plate having a plurality of scraper fingers, with the at least one scraper water channel formed between each scraper finger, the scraper fingers configured to remove a portion of the layer of water from the first side surface of the saw blade; and a second scraper plate having a plurality of scraper fingers to remove a portion of the layer of water from the second side surface of the saw blade.

16. The system of claim 14, further comprising a waste receiver located adjacent the saw blade and opposite the manifold block to receive the water emitted from the first and second nozzle orifices and direct the water into a drain.

17. The system of claim 14, wherein a width of the scraper fingers relative to a width of the at least one scraper water channel is selected to provide a desired amount of water on the endless band saw blade.

* * * * *